US011559177B2

(12) United States Patent
Yoo et al.

(10) Patent No.: US 11,559,177 B2
(45) Date of Patent: Jan. 24, 2023

(54) DRYER STAND

(71) Applicant: LG ELECTRONICS INC., Seoul (KR)

(72) Inventors: Hyunsun Yoo, Seoul (KR); Jaehung Chun, Seoul (KR); Yousook Eun, Seoul (KR); Joogyeom Kim, Seoul (KR); Sungkyung Kim, Seoul (KR); Myongsun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 679 days.

(21) Appl. No.: 16/576,453

(22) Filed: Sep. 19, 2019

(65) Prior Publication Data

US 2020/0085260 A1 Mar. 19, 2020

Related U.S. Application Data

(60) Provisional application No. 62/733,478, filed on Sep. 19, 2018.

(30) Foreign Application Priority Data

Feb. 28, 2019 (KR) ........................ 10-2019-0024052

(51) Int. Cl.
*A47K 10/48* (2006.01)
*A45D 20/12* (2006.01)
*A45D 20/14* (2006.01)
*F16M 11/04* (2006.01)

(52) U.S. Cl.
CPC .............. *A47K 10/48* (2013.01); *A45D 20/12* (2013.01); *A45D 20/14* (2013.01); *F16M 11/048* (2013.01)

(58) Field of Classification Search
CPC ...... A47K 10/48; F16M 11/048; A45D 20/12; A45D 20/14
USPC .............................................. 34/95–100, 239
See application file for complete search history.

(56) References Cited

U.S. PATENT DOCUMENTS

| 5,613,305 A * | 3/1997 | Narrin .................... A45D 20/12 34/91 |
| 5,970,622 A * | 10/1999 | Bahman ................. F16M 11/28 34/97 |
| 6,199,805 B1 * | 3/2001 | Pena ...................... F16M 11/28 248/161 |
| 9,408,452 B1 * | 8/2016 | Al-Khulaifi ........ A46B 15/0002 |
| 10,000,887 B2 * | 6/2018 | Salazar .................. A47F 7/065 |

(Continued)

FOREIGN PATENT DOCUMENTS

| EP | 3626118 A1 * | 3/2020 | ........... A01K 13/001 |
| JP | 58-133004 U | 9/1983 | |
| KR | 10-2018-0043526 A | 4/2018 | |

*Primary Examiner* — Stephen M Gravini
(74) *Attorney, Agent, or Firm* — Birch, Stewart, Kolasch & Birch, LLP

(57) ABSTRACT

A dryer stand for mounting a dryer for discharging air, including a stem, a base, a receptacle on which the dryer is mounted, a moving apparatus including a rotation motor and connected to the receptacle, and a controller. The controller enables the position of the receptacle to be changed or returned by controlling the forward and backward rotation of the rotation motor so that the receptacle is moved in a given direction when a position change command for the receptacle is received and the receptacle returns to its original position when a position return command for the receptacle is received.

17 Claims, 15 Drawing Sheets

(56) References Cited

U.S. PATENT DOCUMENTS

| | | | |
|---|---|---|---|
| 11,154,167 B2* | 10/2021 | Youn | A45D 20/14 |
| 11,172,795 B2* | 11/2021 | Yoo | F16M 11/10 |
| 2006/0076464 A1* | 4/2006 | Van | F16M 11/18 |
| | | | 248/122.1 |
| 2018/0103741 A1 | 4/2018 | Karbakhsh | |
| 2020/0085250 A1* | 3/2020 | Youn | A01K 13/001 |
| 2020/0085251 A1* | 3/2020 | Youn | A45D 20/12 |
| 2020/0085255 A1* | 3/2020 | Yoo | F16M 11/10 |
| 2020/0085260 A1* | 3/2020 | Yoo | A47K 10/48 |
| 2022/0031130 A1* | 2/2022 | Youn | A45D 20/12 |

* cited by examiner

DRYER STAND

CROSS REFERENCE TO RELATED APPLICATIONS

This application claims the priority benefit of U.S. Provisional Application No. 62/733,478, filed on Sep. 19, 2018, and Korean Patent Application No. 10-2019-0024052, filed on Feb. 28, 2019, the entire disclosures of all of which are hereby expressly incorporated by reference into the present application.

BACKGROUND OF THE DISCLOSURE

Field of the Disclosure

The present disclosure relates to a dryer stand on which a dryer for discharging air for drying is mounted. More particularly, the present disclosure relates to a dryer stand, which moves a receptacle on which a dryer is mounted in a given direction if it is necessary to change the discharge direction of air for drying and can return the receptacle to its original position.

Description of the Related Art

If a dryer is used to dry the human body, in general, a user holds a dryer and performs dry while moving the dryer toward a dry portion.

In order to solve inconvenience that a user has to perform dry while holding a dryer, conventionally, there has been proposed a stand on which the dryer can be mounted.

However, the stand according to a conventional technology has a problem in that if a dry portion is to be changed, a user has to directly control the direction of the stand or the human body needs to be moved so that the air discharge direction of the dryer mounted on the stand is directed toward a dry portion.

In particular, the stand according to a conventional technology has a problem in that if an object to be dried is an infant or a pet, the air discharge direction of a dryer has to be frequently changed if a position of the object to be dried is frequently changed.

Furthermore, the stand according to a conventional technology has not suggested a mechanical configuration capable of automatically controlling the air discharge direction of the dryer.

Furthermore, the stand according to a conventional technology has not suggested a detailed configuration for changing a position in order to change the air discharge direction of the dryer and returning the position to its original position.

SUMMARY OF THE DISCLOSURE

A first problem to be solved by the present disclosure is to provide a dryer stand capable of drying an object to be dried without a need for a user to hold the dryer.

A second problem to be solved by the present disclosure is to provide a dryer stand capable of automatically changing the direction of air discharged from the dryer for drying an object to be dried based on the position and size of the object to be dried.

A third problem to be solved by the present disclosure is to provide a dryer stand whose position is changed in order to change the direction of discharge air for drying and is returned to its original position.

The objects of the present disclosure are not limited to the above-described objects and the other objects will be understood by those skilled in the art from the following description.

The present disclosure relates to a dryer stand on which a dryer for discharging air for drying is mounted.

In an aspect, a dryer stand includes a stem, a base, a receptacle on which a dryer is mounted, a moving apparatus including a rotation motor and connected to the receptacle, and a controller configured to control the forward and backward rotation of the rotation motor so that the receptacle is moved in a given direction when a position change command for the receptacle is received and the receptacle returns to its original position when a position return command for the receptacle is received.

The rotation motor may be rotated in the forward and backward direction within a given rotation range symmetrically deployed in both directions of a given reference point. In this case, the original position of the receptacle may be a position of the receptacle when the rotation motor is located at the given reference point.

The controller may control the rotation motor so that the rotation motor is rotated in a second direction that is any one of the forward and backward directions and located at the given reference point when the position return command (hereinafter referred to as an "intermediate return command") is received while the rotation motor is rotated in a first direction that is any one of the forward and backward directions in response to the position change command.

The controller may control the rotation motor so that the rotation of the rotation motor in the first direction is stopped and the rotation motor is rotated in the second direction and located at the given reference point if the first direction and the second direction are opposite when the intermediate return command is received.

The controller may control the rotation motor so that the rotation motor is located at the given reference point only once if the rotation motor is located out of a transition range when the intermediate return command is received if the first direction and the second direction are identical with each other when the intermediate return command is received. In this case, the transition range may be a part of the given rotation range, and may be a range between a first point and a second point symmetrically spaced apart based on the given reference point.

The moving apparatus may include an elevation apparatus including an electrically driven elevation motor and moving the receptacle up and down in a straight line, a rotation apparatus including an electrically driven rotation motor and rotating the receptacle left and right, a tilting apparatus including an electrically driven tilting motor and rotating the receptacle front and back, and a stem rotation apparatus including an electrically driven stem rotation motor and rotating the receptacle left and right by rotating the stem left and right.

The dryer stand further includes a sensing apparatus for detecting a position and size of an object to be dried is detected. The position change command may be a signal to instruct control of at least one of a degree that the receptacle is moved up and down in a straight line, a degree that the receptacle is rotated left and right, or a degree that the receptacle is rotated front and back so that air for drying discharged from the dryer is directed toward the object to be dried based on the position and size of the object to be dried, which is detected by the sensing apparatus.

Means for solving problems that are not described above may be sufficiently derived from the description of embodiments of the present disclosure.

DESCRIPTION OF EXEMPLARY EMBODIMENTS

Figure 1:
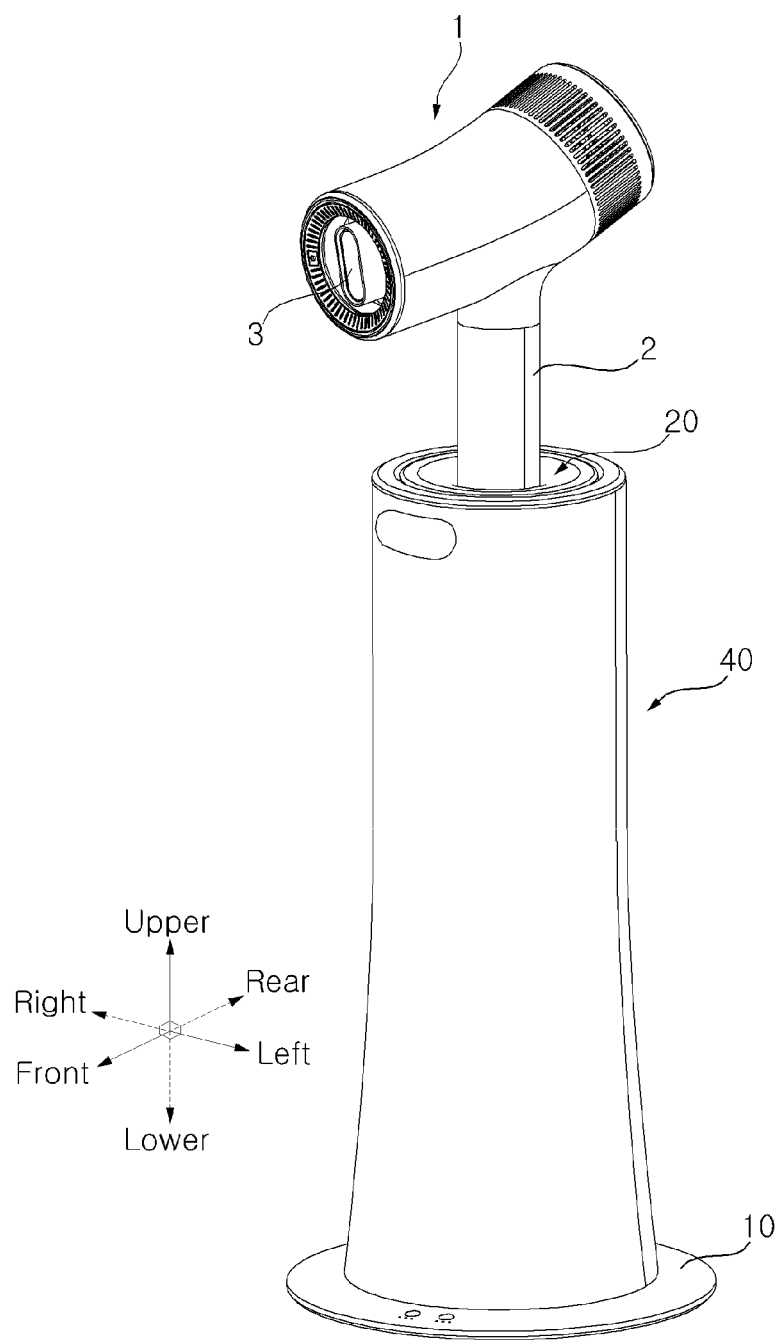
FIG. 1 is a perspective view illustrating the state in which a dryer has been mounted on a dryer stand according to an embodiment.

The advantages and features of the present disclosure and a method of achieving them will become apparent with reference to the embodiments described in detail below together with the accompanying drawings. However, the present disclosure is not limited to the embodiments set forth herein but may be embodied in many different forms, and these embodiments are provided so that the disclosure of the present disclosure is complete and that those skilled in the art will fully understand the scope of the present disclosure, and the present disclosure is only defined by the scope of the claims. Like reference numerals designate like elements throughout the specification.

In the present disclosure, FIG. 1 may be described as a three-dimensional coordinate system named a front, a rear, upper, lower, a left and a right.

Figure 2A:
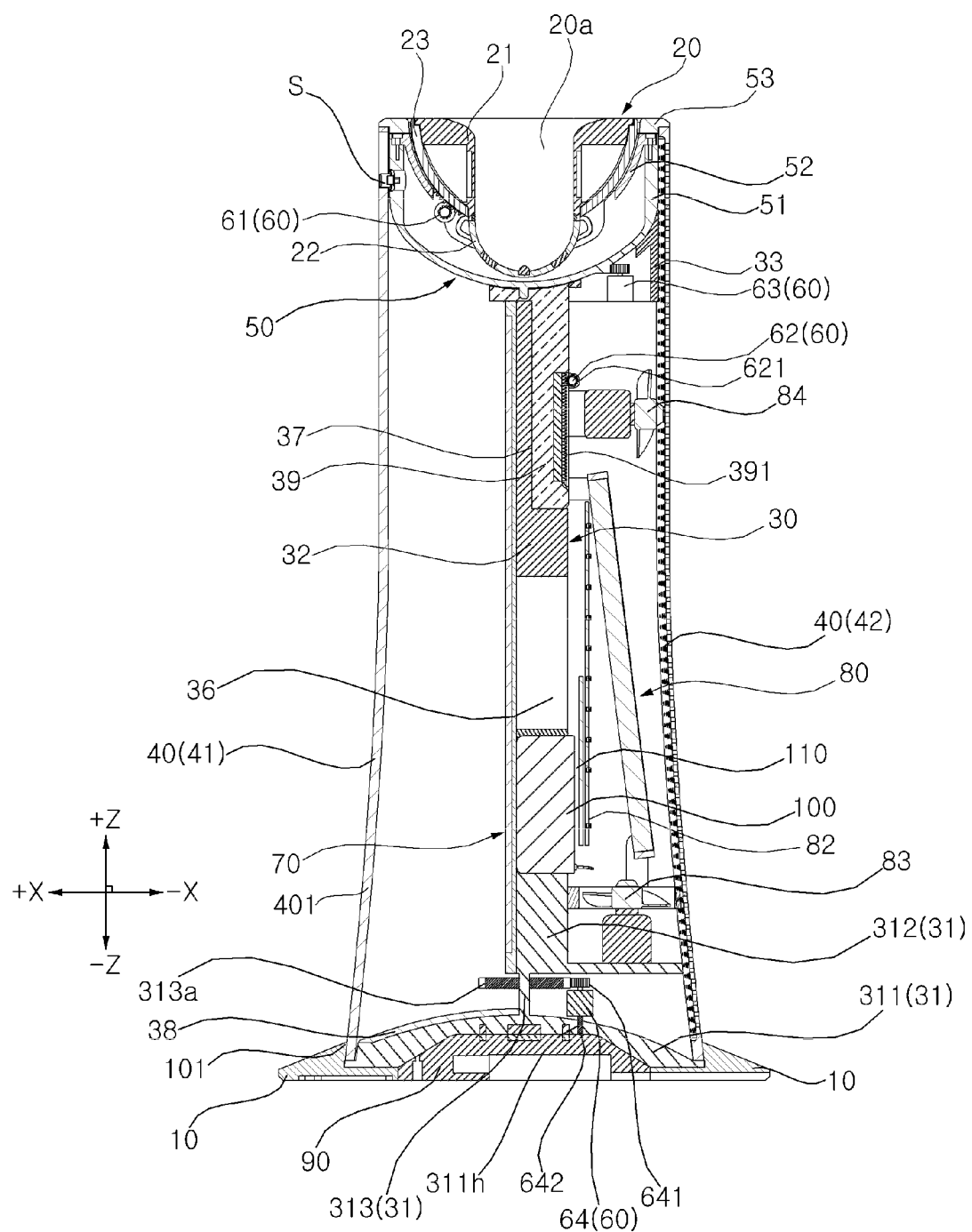
FIGS. 2A and 2B are longitudinal sectional views illustrating the state in which the dryer stand has been coupled to a docking station according to an embodiment.
Figure 3:
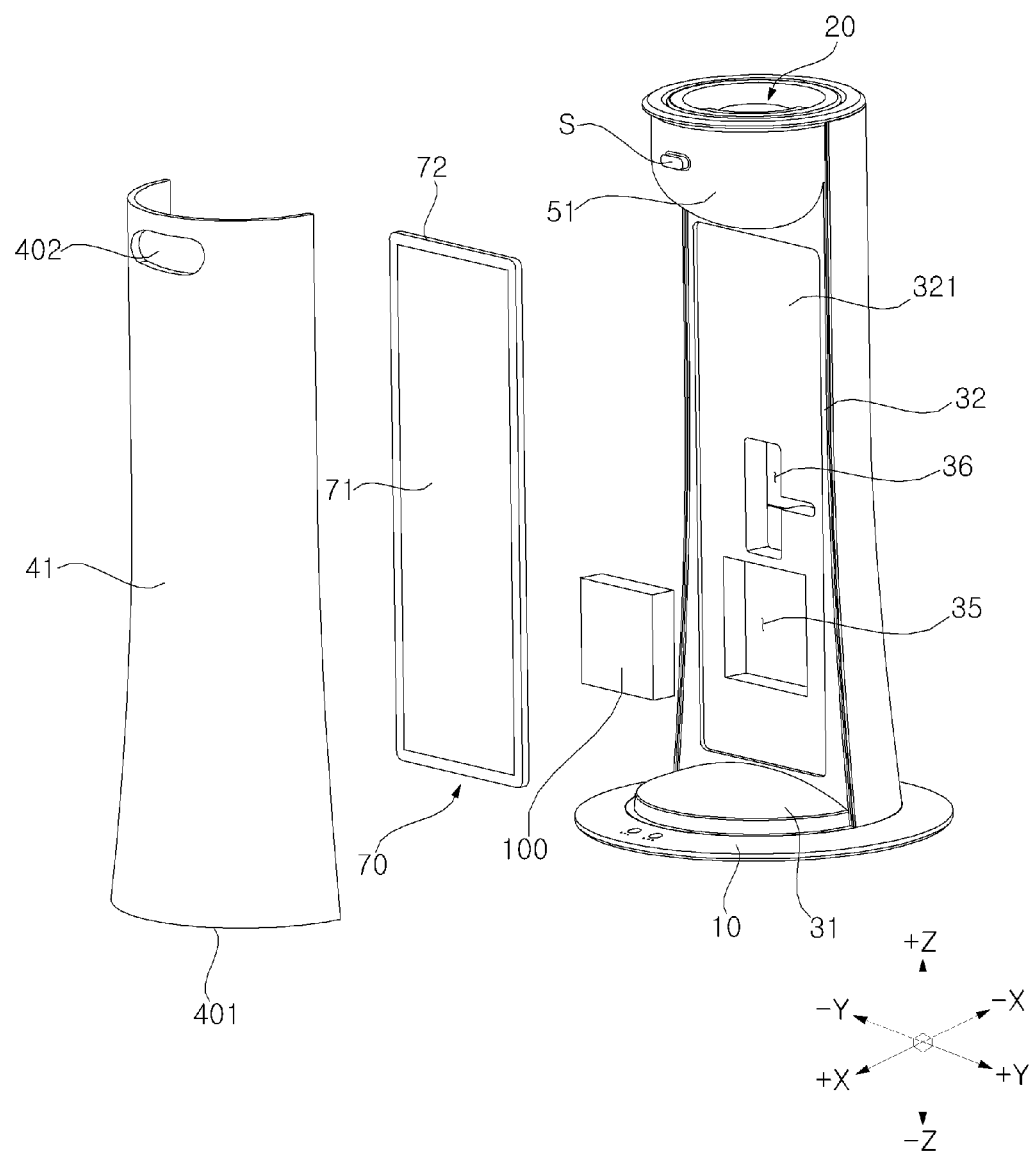
FIG. 3 is an exploded perspective view illustrating the front of the dryer stand according to an embodiment.

The present disclosure may be described based on a spatial orthogonal coordinate system based on an X axis, a Y axis and a Z axis, which are orthogonal to each other in FIG. 2A and is also illustrated in FIG. 3. In this specification, an up and down direction is defined as a Z axis direction, defining a front and rear direction is defined as an X axis direction, and a direction orthogonal to the Z axis and the X axis is defined as the Y axis. Each axis direction (i.e., X axis direction, Y axis direction or Z axis direction) means both directions in which each axis extends. A symbol "+" attached ahead of each axis direction (i.e., +X axis direction, +Y axis direction or +Z axis direction) means a positive direction, that is, any one of both directions in which each axis extends. A symbol "−" attached ahead of each axis direction (i.e., −X axis direction, −Y axis direction or −Z axis direction) means a negative direction, that is, any one of both directions in which each axis extends.

Hereinafter, a dryer stand according to an embodiment is described with reference to FIGS. 1, 2A, 2B, 3 and 4.

Figure 2B:
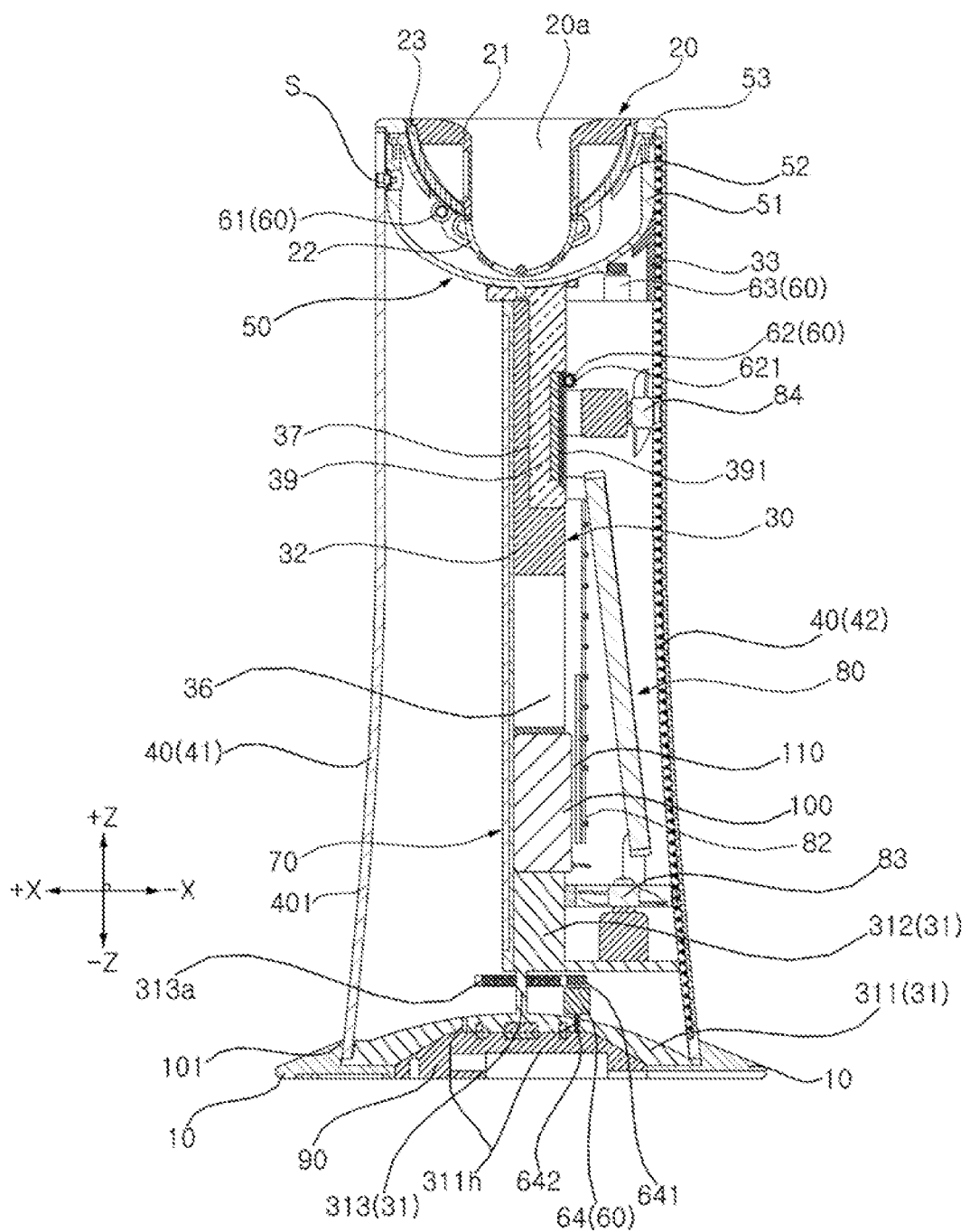
Figure 4:
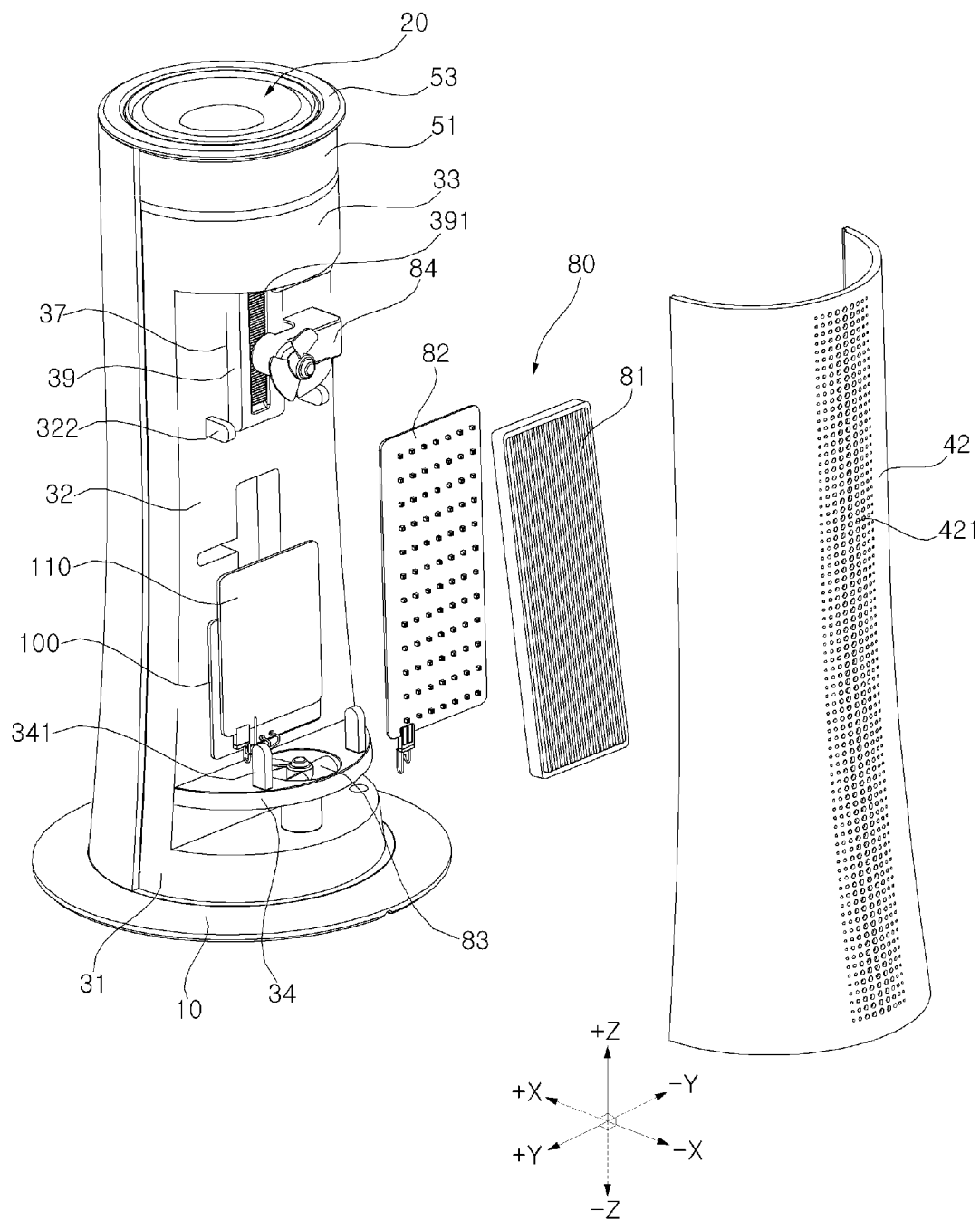
FIG. 4 is an exploded perspective view illustrating the back of the dryer stand according to an embodiment.

FIG. 1 is a perspective view illustrating the state in which a dryer has been mounted on a dryer stand according to an embodiment. FIGS. 2A and 2B are longitudinal sectional views illustrating the state in which the dryer stand has been coupled to a docking station according to an embodiment. FIG. 3 is an exploded perspective view illustrating the front of the dryer stand according to an embodiment. FIG. 4 is an exploded perspective view illustrating the back of the dryer stand according to an embodiment.

The dryer stand (hereinafter simply referred to as the "stand") according to an embodiment can perform dry on an object to be dried without a need for a user to hold a dryer 1 because the dryer 1 can be mounted on the stand, as shown in FIG. 1.

As shown in FIGS. 1, 2A and 2B, the stand according to an embodiment includes a base 10 positioned at the bottom and configured to perform a support function, a receptacle 20 on which a dryer 1 is mounted, and a stem 30 configured to stand upright up and down between the base 10 and the receptacle 20 and to support the receptacle 20 at a location of a given height upward from the base 10.

As shown in FIGS. 1 and 2A, the dryer 1 may be detachably mounted on the receptacle 20.

The stand may include a side cover 40 positioned to surround the stem 30 and form a side appearance of the stand. The side cover 40 may include a front cover 41 and a rear cover 42. The lower end 401 of the side cover 40 may be inserted into a ring-shaped groove 101 formed by the base 10 and a lower plate 31.

In some embodiments, the stem 30 may be omitted, and the side cover 40 may perform the function of the stem. In this case, the side cover 40 may be denoted as the stem.

As shown in FIGS. 2A, 2B, 3 and 4, the stand according to an embodiment may include a lighting device 70 and an air purifier 80.

As shown in FIGS. 2A, 2B and 3, the lighting device 70 may include a light-emitting panel 71 and a lighting frame 72. The light-emitting panel 71 may be configured with an LED plate in which multiple LEDs are embedded.

The lighting frame 72 is inserted into a concave part 321 depressed backward from the front surface of a vertical plate 32, so the lighting device 70 may be seated in the concave part 321 detachably. That is, the lighting device 70 may be detachably seated in the concave part 321. The front cover 41 is positioned in front of the lighting device 70 and may be made of a transparent or semi-transparent material so that light emitted from the lighting device 70 is radiated to the outside.

In some embodiments, the lighting device 70 is curvedly formed using an OLED panel having excellent flexibility so that it closely adheres to the inner side of the front cover 41, thus being capable of improving the radioactivity of light emitted from the OLED panel.

As shown in FIGS. 2A, 2B and 4, the air purifier 80 may include a filter 81 positioned between the vertical plate 32 and the rear cover 42. Furthermore, the air purifier 80 may include a suction fan 83 and a discharge fan 84, which generate a flow of air that is received from the outside and discharged to the outside again via the filter 81. In this case, the reception and/or discharge of the air may be performed through multiple through holes 421 formed in the rear cover 42.

In some embodiments, the filter 81 may be a photocatalytic filter also capable of a pet smell or aged smell removal function (i.e., deodorization function). In this case, a blue light-emitting panel 82 for activating the function of the photocatalytic filter may be positioned in front of the filter 81.

As shown in FIGS. 2A, 2B and 4, a battery 100 may be detachably positioned in the hollow unit 35 (or hollow portion) of the vertical plate 32. A controller 110 may be positioned in the rear of the battery 100. The controller 110 may control the operations of the lighting device 70 and the air purifier 80. Furthermore, the controller 110 may control the operations of a stem rotation apparatus, a rotation apparatus, an elevation apparatus, and a tilting apparatus for controlling the air discharge direction of the dryer 1, and is described more specifically later.

The battery 100 may supply required power to an element that requires power among the elements, and may charge a battery 5 embedded in the dryer 1 if the dryer 1 is mounted on the receptacle 20.

Furthermore, as shown in FIGS. 2A and 2B, the stand includes a docking station 90. External power may be applied to the battery 100 and/or an element that requires power among the elements of the stand through the docking station 90.

The present disclosure has been made to provide the stand, which can automatically change the air discharge direction of the dryer 1 by changing a position based on the position and size of an object to be dried and can then return to its original position, without being limited to the stand on which the dryer 1 is mounted.

To this end, as shown in FIGS. 1, 2A and 2B, the stem 30 to which the receptacle 20 is coupled may be rotated left and right. The receptacle 20 may be rotated left and right and/or front and back or may be moved (or elevated) up and down (e.g., in the Z axis) independently of the stem 30. The operation may be returned to an original position, and a configuration related to the operation is described later in detail. The stem 30 may include an upper trapping piece 322 protruded backward from the vertical plate 32 and a lower trapping piece 341 protruded upward from the partition wall 34. The filter 81 may be positioned in the upper trapping piece 322 and the lower trapping piece 341 detachably. The upper trapping piece 322 may be configured as a pair of spaced upper trapping pieces 322 to support the upper side of the filter 81. The lower trapping piece 341 may be configured as a pair of spaced lower trapping pieces 341 to support the lower side of the filter 81. The filter 81 is interposed between the pair of upper trapping pieces 322 and the pair of lower trapping pieces 341, and may be detachably positioned with inclination in the state in which the lower part of the filter is more backward protruded than the upper part thereof.

Hereinafter, an element capable of automatically changing the air discharge direction of the dryer 1 by changing the position of the receptacle 20, among the elements of the stand, and an element related to the element are described more specifically with reference to FIGS. 1, 2A, 2B and 3 to 10.

Figure 5:
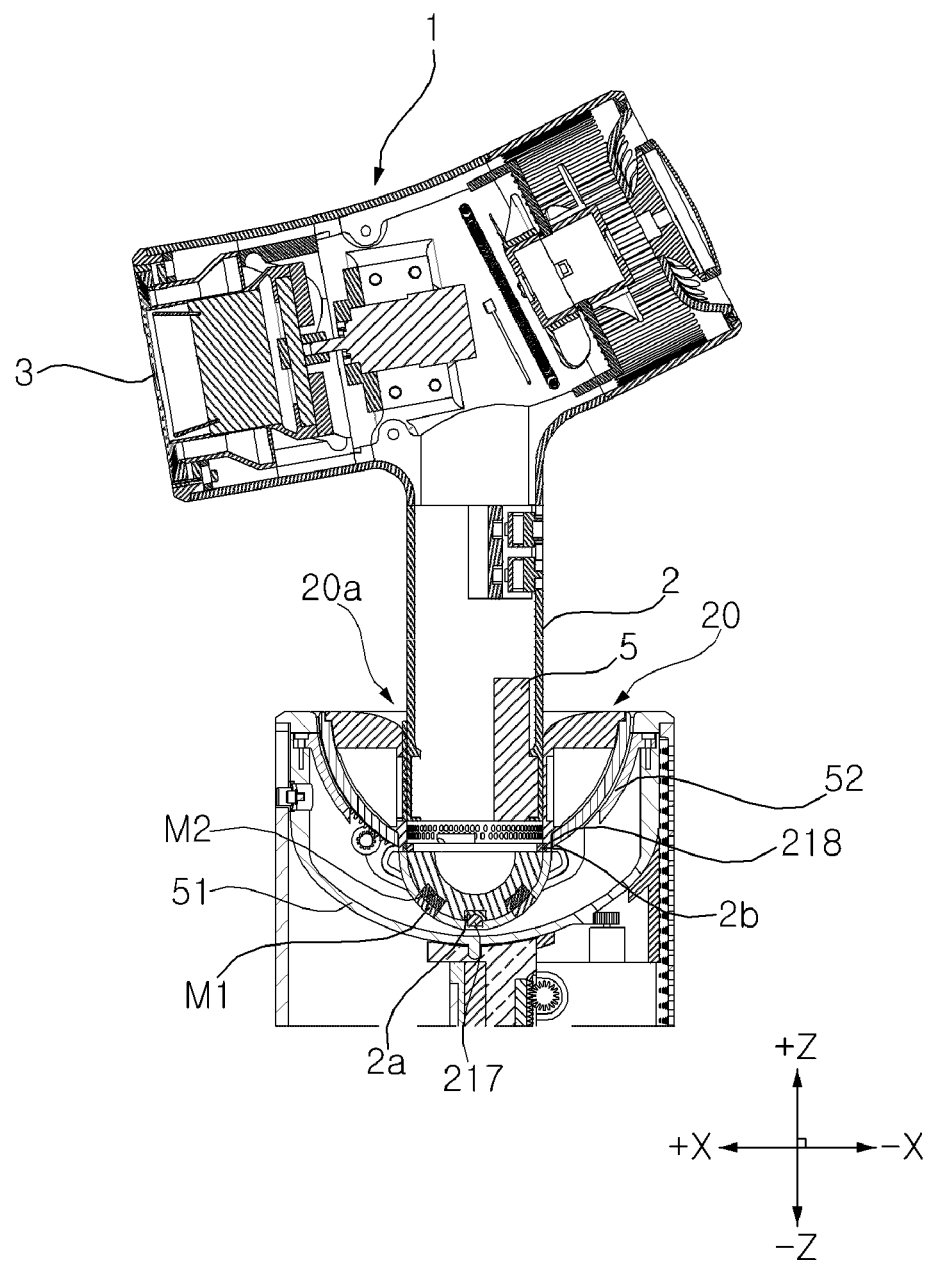
FIG. 5 is a cross-sectional view of an upper part illustrating the state in which the dryer has been mounted on the dryer stand according to an embodiment.
Figure 6:
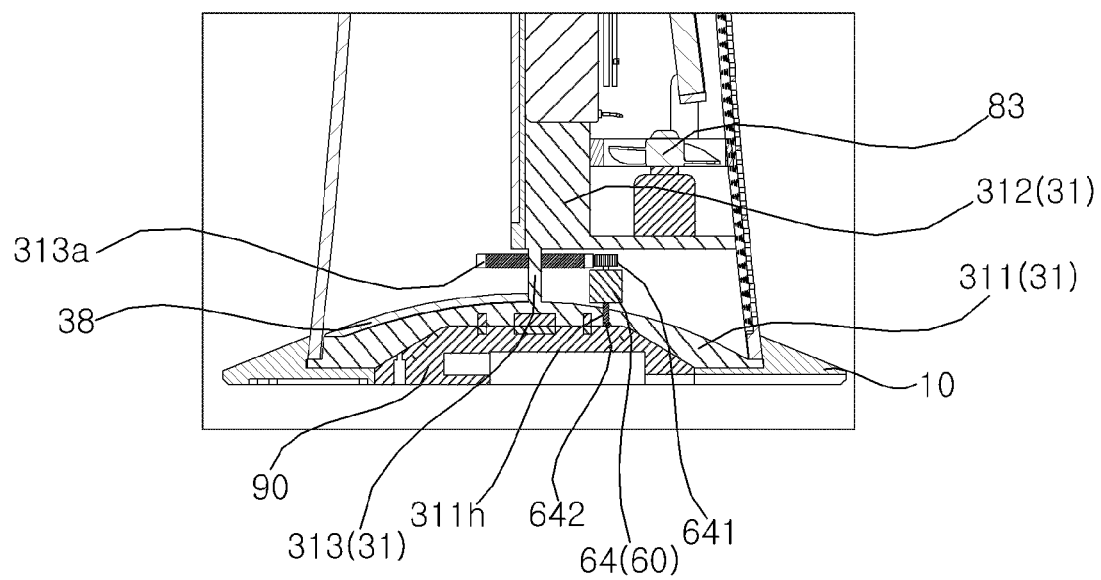
FIG. 6 is a cross-sectional view of a lower part illustrating the dryer stand according to an embodiment.
Figure 7:
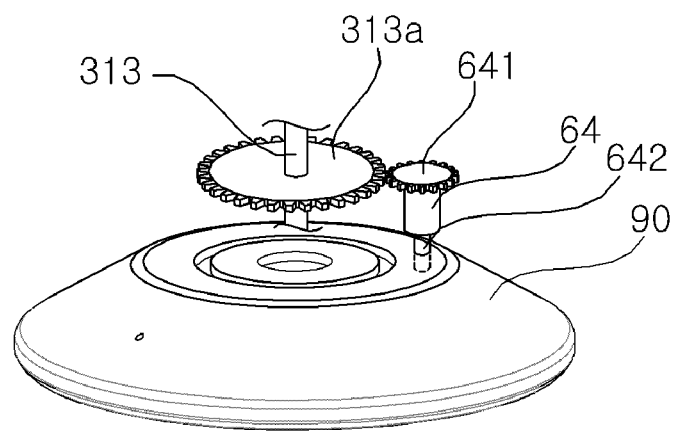
FIG. 7 is a perspective view of the docking station and stem rotation apparatus of the dryer stand according to an embodiment.
Figure 8:
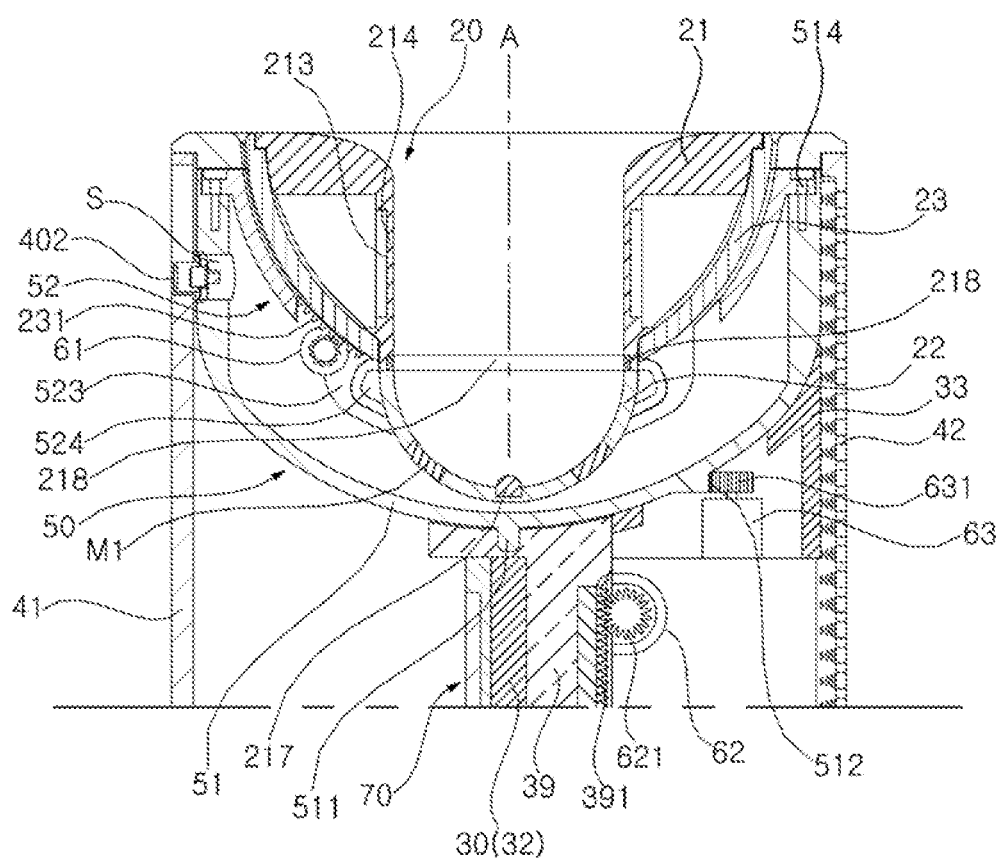
FIG. 8 is a cross-sectional view of an upper part illustrating the dryer stand according to an embodiment.
Figure 9:
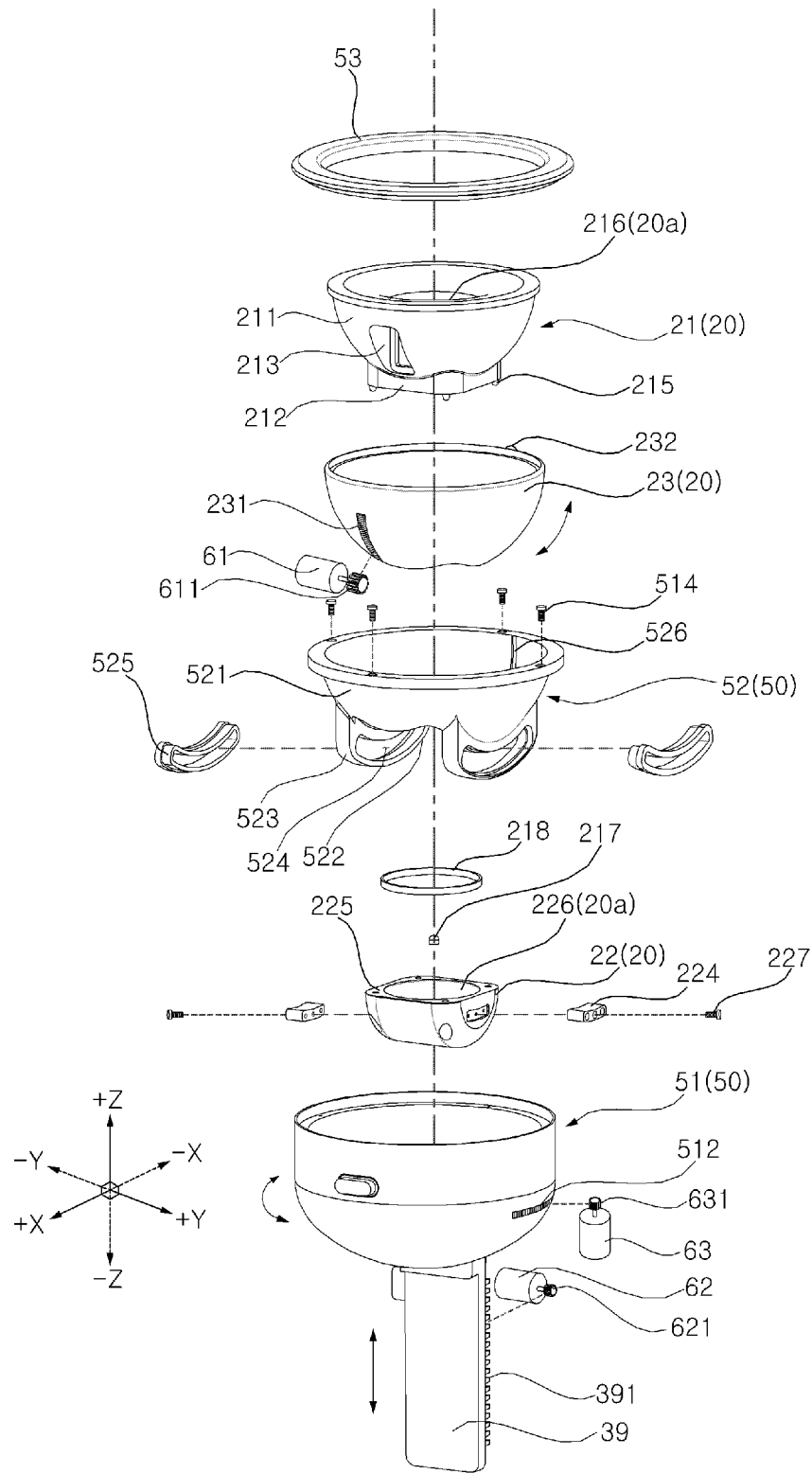
FIG. 9 is an exploded perspective view of an upper part illustrating the dryer stand according to an embodiment.
Figure 10:
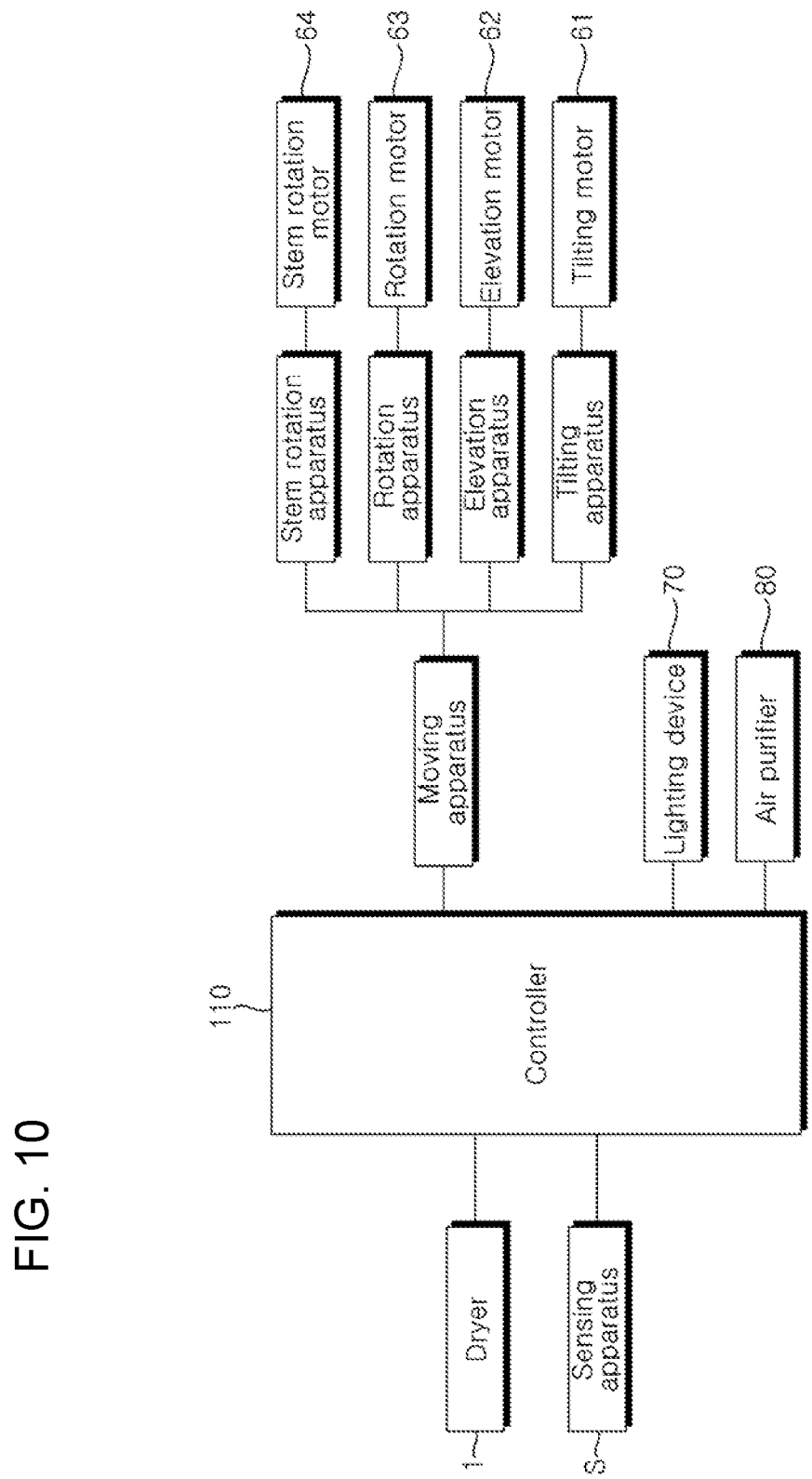
FIG. 10 shows a control system diagram of the dryer stand according to an embodiment.
Figure 11:
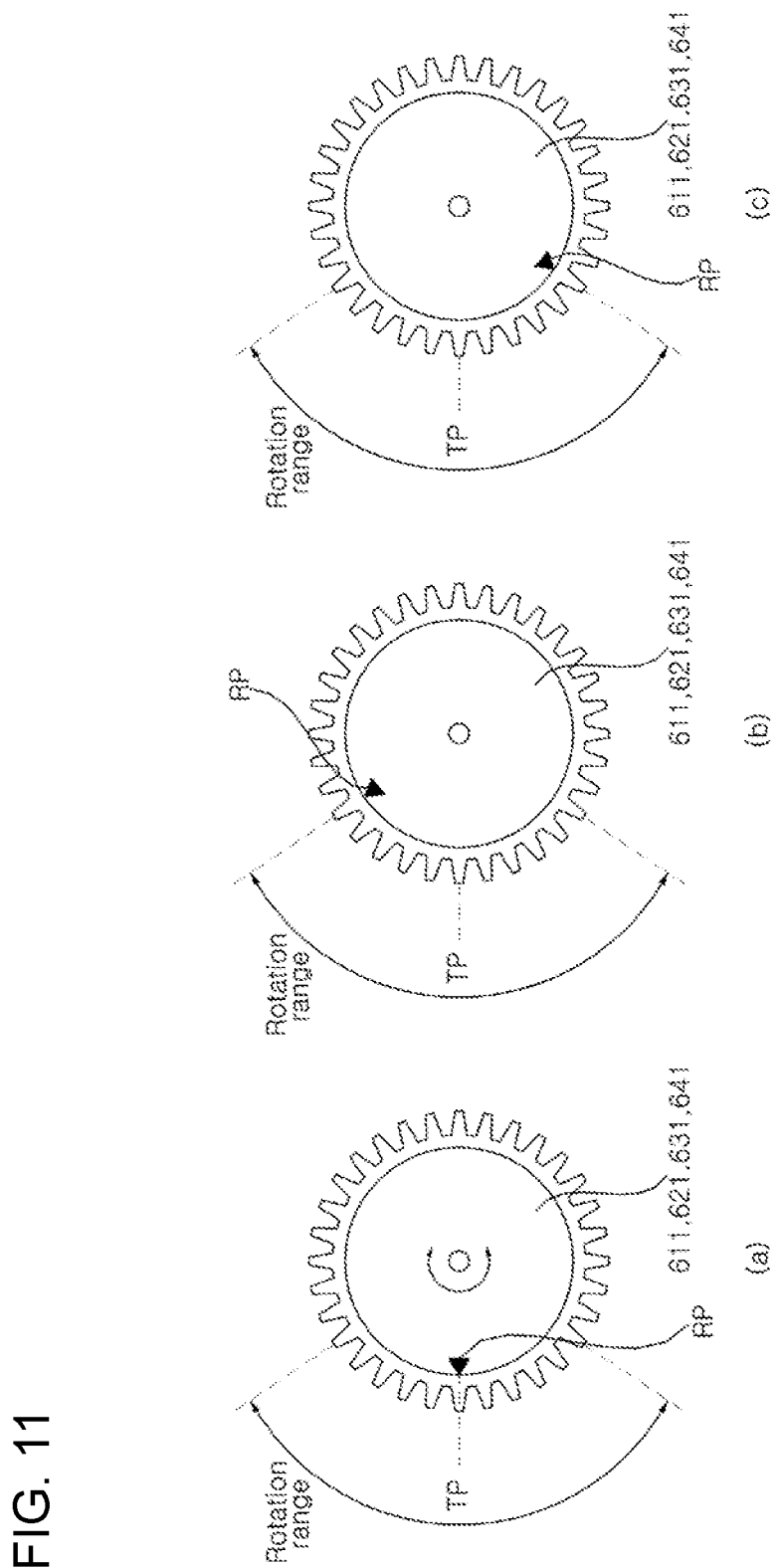
FIGS. 11 to 14 are diagrams illustrating the state in which the rotation of the rotation motor of the dryer stand is controlled according to an embodiment.

FIG. 5 is a cross-sectional view of an upper part illustrating the state in which the dryer 1 has been mounted on the dryer stand according to an embodiment. FIG. 6 is a cross-sectional view of a lower part illustrating the dryer stand according to an embodiment. FIG. 7 is a perspective view of the docking station and stem rotation apparatus of the dryer stand according to an embodiment. FIG. 8 is a cross-sectional view of an upper part illustrating the dryer stand according to an embodiment. FIG. 9 is an exploded perspective view of an upper part illustrating the dryer stand according to an embodiment. FIG. 10 shows a control system diagram of the dryer stand according to an embodiment.

The dryer 1 is an apparatus that performs drying on an object to be dried, such as a person or a pet, using air for drying that is discharged through an outlet 3. As described above, the stand according to an embodiment relates to a stand on which the dryer 1 is mounted.

As shown in FIGS. 2A, 2B and 5, the stand includes the stem 30 extended up and down or in the Z axis direction, the base 10 positioned under the stem 30, the receptacle 20 positioned over the stem 30 and configured to have the dryer 1 detachably mounted thereon, the docking station 90 positioned in the base 10 to apply external power, and a moving apparatus configured to move the receptacle 20 in a given direction.

In this case, the movement is used as a comprehensive meaning, including rotation in the left and right direction (i.e., rotation around the Z axis), a movement in the up and down direction (i.e., a straight-line movement in the Z axis direction) or rotation in the front and rear direction (i.e., rotation around the Y axis), and the same is applied hereunder.

Furthermore, as shown in FIG. 10, in the present disclosure, the moving apparatus includes a stem rotation apparatus for rotating the receptacle 20 coupled to the stem 30 left and right by rotating the stem 30 left and right, a rotation apparatus for rotating the receptacle 20 left and right independently of the stem 30, an elevation apparatus for moving the receptacle 20 up and down in a straight line, and a tilting apparatus for rotating the receptacle 20 front and back, which are sequentially described.

As shown in FIGS. 2A, 2B and 4, the stem 30 may include the lower plate 31 positioned over the docking station 90, the vertical plate 32 extended upward from the lower plate 31, and an extension unit 33 (or extension portion) backward extended from an end on the upper side of the vertical plate 32 and then downward curved.

The lighting device 70 is positioned in front of the stem 30 and can emit light. The air purifier 80 is positioned in the rear of the stem 30 and can remove smell by decomposing a harmful substance in the air.

More specifically, the air purifier 80 may be positioned in a partition wall 34 protruded backward from the lower side of the vertical plate 32. The battery 100 may be positioned in the hollow unit 35 formed on the lower side at the center of the vertical plate 32. A hole 36 through which an electric wire electrically connected to each of elements included in the stand passes may be formed over the hollow unit 35. Furthermore, the receptacle 20 may be coupled to the top of the vertical plate 32 through the medium of a vertical rod 39.

The vertical rod 39 may be positioned in a groove 37 that is lengthily formed up and down at the back of the upper side of the vertical plate 32 in such a way as to move up and down. In other words, at least part of the vertical rod 39 may be inserted into the groove 37 to move up and down, which is described more specifically later.

As shown in FIGS. 2A and 2B, the base 10 functions as the support of the stand, and the stem 30 or the lower plate 31 may provide the space where the docking station 90 is placed.

That is a hollow unit 12 that penetrates the base 10 up and down is formed at the center of the base. The docking station 90 is positioned (i.e., inserted) in the hollow unit 12 of the base, and may be positioned under the stem 30 or the lower plate 31.

As described above, the docking station 90 may apply external power to the battery 100 included in the stand and/or an element that requires power among the elements of the stand, such as a rotation motor 60.

To this end, an electrode terminal electrically connected to an electrode terminal provided in the docking station 90 may be provided at the bottom of the lower plate 31 so that external power can be applied to the stand through the docking station 90.

As shown in FIGS. 2A, 2B, 5, 8 and 9, the receptacle 20 includes a tub 21, 22 configured to form a groove 20a into which the grip 2 of the dryer 1 is inserted. The tub 21, 22 may include an upper tub 21 and a lower tub 22.

The upper tub 21 may include a tub body 211 formed in an approximately hemispherical shape having a wide-top narrow-bottom shape and a lower protrusion unit 212 (or lower protrusion portion) extended downward from the tub body 211. The upper tub 21 may include an aperture 216 that forms a portion of the groove 20a of the tub 21, 22. That is, the groove 20a of the tub 21, 22 includes an aperture 216 of the upper tub 21. The lower tub 22 may include an aperture 226 that forms a portion of the groove 20a of the tub 21, 22. That is, the groove 20a of the tub 21, 22 may also include the aperture 226 of the lower tub 22. A portion 214 positioned between the concave part 213 and the groove 20a has a smaller thickness than other portions due to the concave part 213.

A concave part 213 that is depressed inward may be formed on at least one side of the tub body 211. As a result, a portion that belongs to the tub body 211 and that is positioned between the concave part 213 and the groove 20a has a smaller thickness than other portions. Accordingly, heat generated within the dryer 1 inserted into the groove 20a while the dryer 1 operates can be discharged through the concave part 213.

Protrusions 215 may be formed on a surface on the lower side of the lower protrusion unit 212. Grooves 225 into which the protrusions 215 are inserted may be formed in a surface on the upper side of the lower tub 22. Accordingly, the upper tub 21 and the lower tub 22 may be integrated and coupled.

Furthermore, the receptacle 20 may include a tub cover 23 to surround the outskirts of the upper tub 21. The tub cover 23 is formed in an approximately hemispherical shape having a wide-top narrow-bottom shape. The tub cover 23 is positioned to surround the outskirts of the tub body 211, and may be integrated and coupled to the upper tub 21.

The receptacle 20 may be received into a supporter 50 positioned at the top of the vertical rod 39. The supporter 50 can support the receptacle 20 movably between the receptacle 20 and the stem 30.

If the grip 2 of the dryer is inserted into the receptacle 20, first and second target contact terminals 2a and 2b electrically connected to first and second contact terminals 217 and 218 may be positioned in the grip. In the present disclosure, when the grip 2 is inserted into the groove 20a, the grip 2 is fixed to the groove 20a at a specific location by means of fixing means, such as a magnet M1, M2. Accordingly, the discharge direction of air for drying discharged through the outlet 3 of the dryer 1 can be changed by moving the receptacle 20. The first contact terminal 217 and the first subject contact terminal 2a are disposed at the center of the bottom surface of the groove 20a of the receptacle 20a or at the center of the bottom surface of the grip 2 of the dryer, and the second contact terminal 218 and the second subject contact terminal 2b are formed in a ring shape. Accordingly, even when the grip 2 and the receptacle 20 of the dryer are rotated relative to each other, the contact terminals may maintain the electrical connected state.

As shown in FIGS. 2A, 2B, 5, 8 and 9, the supporter 50 may include a supporter body 51 rotatably coupled to the top of the vertical rod 39 and a guide supporter 52 fixed to the upper side of the supporter body 51 by a set screw 514 and received into the supporter body 51. The top of the supporter 50 may be covered with the ring-shaped upper cover 53.

The supporter body 51 may be formed in an approximately tub shape having a top open and a bottom of a hemispherical shape. The receptacle 20 is coupled to the guide supporter 52, which can guide a movement of the receptacle 20 and can be moved along with the receptacle 20. This is described more specifically later.

As described above, the receptacle 20 is coupled to the supporter 50, and the supporter 50 is coupled to the vertical rod 39 inserted into the groove 37 of the stem 30. Accordingly, when the stem 30 is rotated left and right, the vertical rod 39, the supporter 50 and the receptacle 20 can also be rotated left and right. Accordingly, the discharge direction of air from the outlet 3 of the dryer mounted on the receptacle 20 can be changed left and right.

As shown in FIGS. 2A, 2B and 6, the stem rotation apparatus may include an electrically driven stem rotation motor 64, a stem rotation pinion 641 coupled to the rotation shaft of the stem rotation motor 64, a stem rotation sear 313a seared with the stem rotation pinion 641, and a fixing rod 642 configured to fix the stem rotation motor 64 to any one location.

The stem rotation apparatus may be positioned in the lower plate 31, and is described more specifically below.

The lower plate 31 may include a first plate 311, a second plate 312, and a third plate 313.

At least part on the lower side of the first plate 311 may come in contact with the top of the docking station 90 in such a way as to slide with respect to the docketing station 90. To this end, for example, a lateral cross section (i.e., a cross section on the X-Y plane) of the docking station 90 may be a circle. As shown in FIG. 7, the first plate 311 may rotate left and right (i.e., rotate around the Z axis) with respect to the fixed docking station 90, while relatively sliding.

At least part on the upper side of the second plate 312 may be coupled to the vertical plate 32. The second plate 312 and the vertical plate 32 may be formed in an integrated manner.

The third plate 313 may be interposed between the first and second plates 311 and 312. The first, second and third plates 311, 312, and 313 may be formed in an integrated manner.

In this case, the fixing rod 642 fixing the stem rotation motor 64 to any one place may be extended upward from the docking station 90. In this case, a rod hole 311h into which the fixing rod 642 is inserted may be formed in the first plate 311.

As described above and will be described later, the stem rotation apparatus according to an embodiment may relatively rotate the stem 30 and the receptacle 20 left and right with respect to the fixed base 10 and the docking station 90 at any one location. To this end, the fixing rod 642 may be fixed and coupled to the top of the docking station 90.

That is, as the stem rotation apparatus operates, the first plate 311 needs to relatively rotate left and right with respect to the fixing rod 642. Accordingly, the rod hole 311h into which the fixing rod 642 is inserted may be formed to have a shape corresponding to the rotation trajectory of the first plate 311.

As shown in FIG. 2A, an angle formed by the rotation trajectory of the first plate 311 according to an embodiment may be smaller than 360°. That is, the angle formed by the rotation trajectory may be an angle until the fixing rod 642 or the stem rotation motor 64 interferes with the reflection plate 38 positioned over the first plate 311.

In this case, the reflection plate 38 is a member that reflects light, emitted from the lighting device 70, toward the front cover 41.

As shown in FIG. 2B, the rotation trajectory of the first plate 311 according to another embodiment may be 360°. To this end, a hole is also formed in the reflection plate 38. Accordingly, while the first plate 311 is rotated, the fixing rod 642 or the stem rotation motor 64 can be prevented from interfering with the reflection plate 38.

That is, in the present disclosure, an angle formed by the rotation trajectory of the first plate 311 is not specifically limited.

The step rotation gear 313a may be positioned on one side of the third plate 313. In some embodiments, the third plate 313 may be formed of the step rotation gear 313a.

Accordingly, as the stem rotation motor 64 is rotated forward and backward, the receptacle 20 coupled to the stem 30 through the medium of the stem 30 the vertical rod 39 and the supporter 50 may be rotated relatively left and right (i.e., rotate around the Z axis) with respect to the fixed base 10 and the docking station 90. Accordingly, the discharge direction of air from the outlet 3 of the dryer 1 can be controlled in the left and right directions (i.e., rotate around the Z axis).

Furthermore, as described above, the lighting device 70 is positioned in front of the stem 30, the air purifier 80 is positioned in the rear of the stem 30, and the stem rotation motor 64 is rotated forward and backward. Accordingly, the lighting device 70 and the air purifier 80 coupled to the stem 30, the receptacle 20, and the stem 30 can be rotated left and right (i.e., rotate around the Z axis) relatively with respect to the fixed base 10 and the docking station 90.

As described above, the side cover 40 forms an appearance of the side of the stand, and may include the front cover 41 and the rear cover 42.

Such rotation of the side cover 40 is necessary for the lighting device 70, which is positioned in front of the stem 30, to face the front cover 41, and for the air purifier 80 positioned in the rear of the stem 30, to face the rear cover 42, to operate normally.

That is, the lighting device 70 and the air purifier 80 can operate normally only if light emitted from the lighting device 70 is radiated to the outside through the front cover 41 or air purified through the air purifier 80 is received through the through holes 421 formed in the rear cover 42.

To this end, the side cover 40 may be detachably fixed to the first plate 311. That is, the side cover 40 and the first plate 311 are detachably coupled by snap-fit coupling. When the side cover 40 is coupled to the first plate 311, the side cover 40 can also be rotated by the rotation of the first plate 311.

Accordingly, when the stem rotation motor 64 is rotated forward and backward, the stem 30, the receptacle 20, the lighting device 70, the air purifier 80, the front cover 41, and the rear cover 42 can be rotated left and right (i.e., rotate around the Z axis) relatively with respect to the fixed base 10 and the docking station 90.

As shown in FIGS. 2A, 2B, 3, 5, 8 and 9, the stand according to an embodiment includes a sensing apparatus S for detecting the position and size of an object to be dried. The sensing apparatus S may be an image photographing apparatus, such as a camera, or a proximity sensor.

The sensing apparatus S may detect the position and size of an object to be dried, which is positioned outside the stand, through a detection hole 402 formed in the front cover 41.

The sensing apparatus S is positioned on the front surface of the supporter body 51 and may be moved along with a movement of the supporter body 51. In this case, the detection hole 402 is formed by taking into consideration a moving range and an angle of view of the sensing apparatus S.

In an embodiment of the present disclosure, the sensing apparatus S is spaced apart from the supporter body 51 and may be fixed to a given location regardless of a movement of the supporter body 51. In this case, the detection hole 402 may be formed by taking into consideration the fixing location and an angle of view of the sensing apparatus S.

As the stem rotation motor 64 is rotated forward and backward, the sensing apparatus S may be rotated left and right (i.e., rotate around the Z axis) relatively with respect to the fixed base 10 and the docking station 90. Accordingly, the position and size of an object to be dried, which is adjacent to the stand, can be detected by controlling an angle of view of the sensing apparatus S in left and right directions.

The stand according to an embodiment may include a controller 110. The controller 110 may control the operation of the stem rotation apparatus, as shown in FIG. 10.

The controller 110 may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or other electrical units (or electrical components) for performing functions.

The controller 110 may automatically control the left and right rotation of the stem 30, the receptacle 20, and the sensing apparatus S by controlling the rotation direction and angle of the stem rotation motor 64 based on information (e.g., the position and size of an object to be dried) on the object to be dried, which is detected by the sensing apparatus S.

A configuration in which the receptacle 20, the lighting device 70, the air purifier 80, the side cover 40, and the sensing apparatus S coupled to the stem 30 is rotated left and right by rotating the stem 30 left and right using the stem rotation apparatus has been described above.

Furthermore, an embodiment of the present disclosure includes an element for rotating the receptacle 20 left and right or front and back or moving the receptacle 20 up and down without rotating the stem 30. This is described more specifically below.

As shown in FIGS. 2A, 2B, 5, 8 and 9, the stand according to an embodiment may include the rotation apparatus for rotating the receptacle 20 left and right. The rotation apparatus may be positioned in the supporter 50.

The rotation apparatus may include an electrically driven rotation motor 63, a rotation pinion 631 connected to the rotation shaft of the rotation motor 63, and rotation gear teeth 512 geared with the rotation pinion 631.

The rotation gear teeth 512 may be formed on one side of the supporter 50. More specifically, the rotation gear teeth 512 may be extended laterally in an arc shape along a curved circumference surface of the supporter body 51 under the supporter body 51.

As described above, the top of the vertical rod 39 may be connected to the bottom of the supporter body 51. In this case, an inward depressed groove is formed in a top surface of the vertical rod 39. A protruded part 511 rotatably inserted into the groove may be formed at the bottom or at the center of the bottom of the supporter body 51.

Accordingly, the receptacle 20 coupled to the supporter body 51 can be rotated left and right (i.e., rotate around the Z axis) through the medium of the supporter body 51 and the guide supporter 52 by rotating the rotation motor 63 forward and backward around the protruded part 511 inserted into the groove.

The stand according to an embodiment may further include the elevation apparatus for moving the vertical rod 39 and the supporter 50 up and down. The elevation apparatus may be positioned in the stem 30.

The elevation apparatus may include an electrically driven elevation motor 62, an elevation pinion 621 coupled to the rotation shaft of the elevation motor 62, and the vertical rod 39 in which an elevation rack 391 seared with the elevation pinion 621 is formed in the rear side of the vertical rod and which is movably positioned in the stem 30 up and down.

Accordingly, the receptacle 20 coupled to the supporter body 51 can be moved up and down (i.e., move in the Z axis direction) through the medium of the supporter body 51 coupled to the top of the vertical rod 39 and the guide supporter 52 by rotating the elevation motor 62 forward and backward.

As shown in FIGS. 4 and 5, if the supporter body 51 is at the lowest position, the extension unit 33 may support at least part of the bottom of the supporter body 51, so that the supporter body 51 can rotate left and right. Accordingly, the left and right rotation of the receptacle 20 can be further stabilized.

Furthermore, the vertical rod 39 is moved up and down because the rotation motor 63 is coupled to the vertical rod 39, and thus the rotation motor 63 is also moved up and down. Accordingly, the up and down movement of the supporter body 51 and the left and right rotation of the receptacle 20 can be performed at the same time or at different times.

The stand according to an embodiment may further include the tilting apparatus for rotating the receptacle 20 front and back (i.e., tilting rotation around the Y axis). In this case, the receptacle 20 may be received within the supporter body 51 in such a way as to be tilted front and back.

The tilting apparatus may include an electrically driven tilting motor 61, a tilting pinion 611 coupled to the rotation shaft of the tilting motor 61, and tilting gear teeth 231 geared with the tilting pinion 611. The tilting gear teeth 231 may be extended and formed up and down in an arc shape in the outer surface of the tub cover 23.

Furthermore, the tilting apparatus may include a guide supporter 52 as an element for guiding the tilting of the receptacle 20.

The guide supporter 52 may include a trumpet-shaped guide body 521 in which a lower central part 522 is open and an inner side forms an arc shape up and down and a pair of guide rails 523 which is downward protruded from both ends of the guide body 521 and in which an arc-shaped guide groove 524 is formed front and back.

As shown in FIG. 9, a buffering rail 525 capable of performing a buffering function and reducing a friction force may be inserted into the guide rail 523.

The receptacle 20 may be coupled to the guide supporter 52 and tilted. More specifically, the protruded pieces 224 coupled by the set screw 227 may be inserted into the guide groove 524 formed in the guide rail 523 on both sides of the lower tub 22 in such a way as to be rotated front and back (i.e., rotate around the Y axis).

Accordingly, the protruded piece 224 can be moved along the guide groove 524 by rotating the tilting motor 61 forward and backward, so the receptacle 20 can be rotated front and back (i.e., rotate around the Y axis).

In order to guide the rotation and tilting of the receptacle 20 in the front and rear direction more stably, a protruded part 232 is formed at the outer side of the tub cover 23, and a groove 526 into which the protruded part 232 is inserted and guide may be formed in the inner side of the guide body 521.

In the stand according to an embodiment, the stem 30 can be rotated left and right by the moving apparatus, and at the same time or at different times, the receptacle 20 can be rotated left and right, can be moved up and down and/or can be rotated front and back independently of the stem 30.

The controller 110 may automatically control a movement of the receptacle 20 along with the stem 30 or independently of the stem 30 by controlling the rotation direction and angle of at least one of the stem rotation motor 64, the rotation motor 63, the elevation motor 62 or the tilting motor 61 based on information (e.g., the position and size of an object to be dried) on the object to be dried, which is detected by the sensing apparatus S.

Hereinafter, a configuration capable of returning the receptacle 20 to its original position, among the elements of the stand according to an embodiment, and an element related to the configuration are described more specifically based on the configuration for changing the position of the receptacle 20 and an operation principle thereof with reference to FIGS. 1, 2A, 2B, 3 to 14.

FIGS. 11 to 14 are diagrams illustrating the state in which the rotation of the rotation motor of the dryer stand is controlled according to an embodiment.

As described above, the moving apparatus includes the stem rotation motor 64, the rotation motor 63, the elevation motor 62 and the tilting motor 61 as the rotation motor 60. The controller 110 may control the discharge direction of air for drying by controlling the position of the receptacle 20 using the moving apparatus.

In this case, a configuration for changing the position of the receptacle 20 by moving the receptacle 20 up and down in a straight line, rotating the receptacle 20 front and back, or rotating the receptacle 20 left and right by rotating the stem 30 left and right may be used as the configuration for returning the receptacle 20 to its original position without any change.

That is, the controller 110 may control the forward and backward rotation of the rotation motor 60 so that the receptacle 20 is moved in a given direction (e.g., a predetermined direction) when a position change command is received and the receptacle 20 returns to its original position when a position return command for the receptacle 20 is received by the moving apparatus.

The position change command may be a signal that instructs control of at least one of a degree that the receptacle 20 is moved up and down in a straight line, a degree that the receptacle is rotated left and right, or a degree that the receptacle is rotated front and back so that air for drying discharged from the dryer 1 is directed toward an object to be dried based on the position and size of the object to be dried, which is detected by the sensing apparatus S.

Furthermore, the position return command may be a signal that instructs control of at least one of a degree that the receptacle 20 is moved up and down in a straight line, a degree that the receptacle is rotated left and right, or a degree that the receptacle is rotated front and back so that the receptacle 20 returns to a preset original position.

Hereinafter, the rotation of the rotation motor 60 is described as being the same as that of the pinion 611, 621, 631, 641 connected to the rotation shaft of the rotation motor 60. Furthermore, the position of the rotation motor 60 is described as being the same as that of a given point RP on the pinion 611, 621, 631, 641 within a rotation range.

As shown in FIGS. 11 to 14, the rotation motor 60 may rotate forward or backward within a given rotation range symmetrically deployed in both directions of a given reference point TP.

As shown in FIGS. 11(b) and 11(c), the rotation range may be a rotation range in which a given point RP on the pinion 611, 621, 631, 641 may be located.

In this case, the original position (or initial position) of the receptacle 20 may be a position of the receptacle 20 when the rotation motor 60 is located at the given reference point TP.

That is, if the stand according to an embodiment includes the tilting apparatus, the elevation apparatus, the rotation apparatus, and the stem rotation apparatus as the moving apparatus, the receptacle 20 may be located at the original position when each of the tilting motor 61, the elevation motor 62, the rotation motor 63 and the stem rotation motor 64 is located at the given reference point TP.

For example, at the original position of the receptacle 20, the receptacle 20 may be rotated (or tilted) front and back to the same degree, the receptacle 20 may be rotated left or right to the same degree, and the receptacle 20 may be moved upward only.

If a position return command is received "after" the rotation motor 60 is rotated in any one of forward and backward directions in response to a position change command, the controller 110 may control the rotation motor 60 so that it is rotated in any one of the forward and backward directions and positioned at the given reference point TP.

In contrast, if a position return command (hereinafter referred to as an "intermediate return command) is received "while" the rotation motor 60 is rotated in a first direction A1, that is, any one of forward and backward directions, in response to a position change command, it is necessary to control the rotation motor 60 by taking into consideration an inertial force when the rotation motor 60 is rotated in the first direction A1.

That is, this corresponds to a case where an intermediate return command is received "while" the rotation motor 60 becomes close to a given reference point TP in response to a position change command. If the distance between the rotation motor 60 and the given reference point TP is a given value or less when the intermediate return command is received, there may be a problem in that the rotation motor 60 is located after passing by the given reference point TP due to the inertial force of the rotation motor 60. In order to solve this problem, the present disclosure proposes the following configuration.

If a position return command (hereinafter referred to as an "intermediate return command") is received "while" the rotation motor 60 is rotated in the first direction A1, that is, any one of the forward and backward directions, in response to the position change command, the controller 110 may control the rotation motor 60 so that the rotation motor is rotated in a second direction A2, that is, any one of the forward and backward directions, and is located at the given reference point TP.

Figure 12:
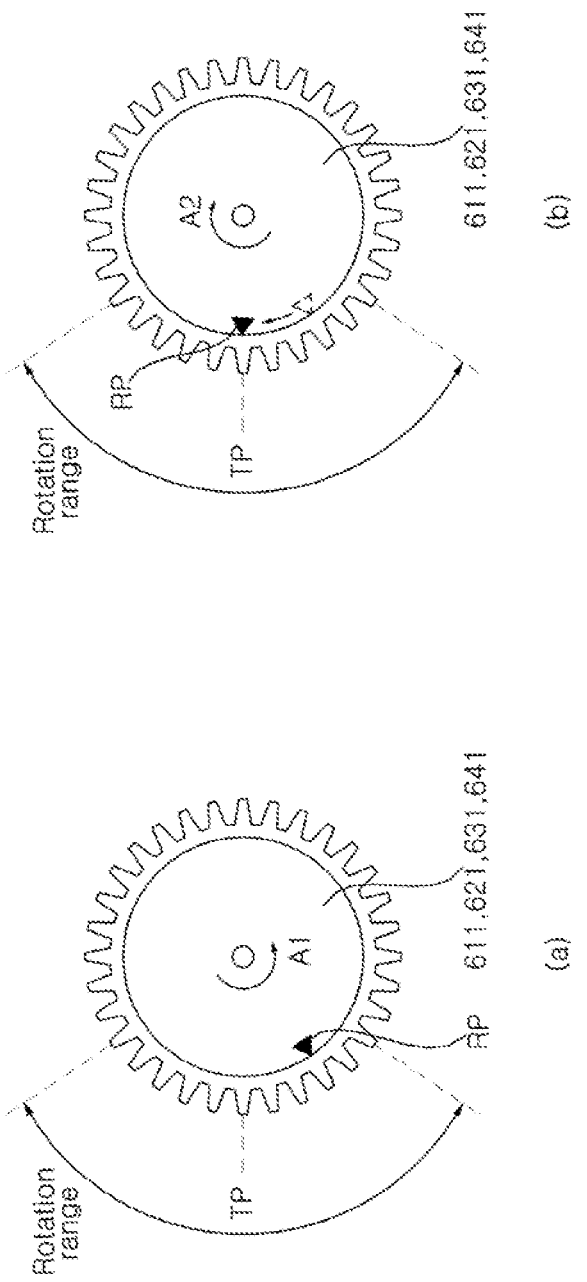

As shown in FIG. 12, if the intermediate return command is received, when the first direction A1 and the second direction A2 are "opposite each other," the controller 110 may perform control as follows. That is, the controller 110 may perform control so that the rotation of the rotation motor 60 or the pinion 611, 621, 631, 641 in the first direction is stopped, the rotation motor 60 or the pinion 611, 621, 631, 641 is rotated in the second direction A2, and thus the rotation motor 60 or the given point RP is located at the given reference point TP.

Figure 13:
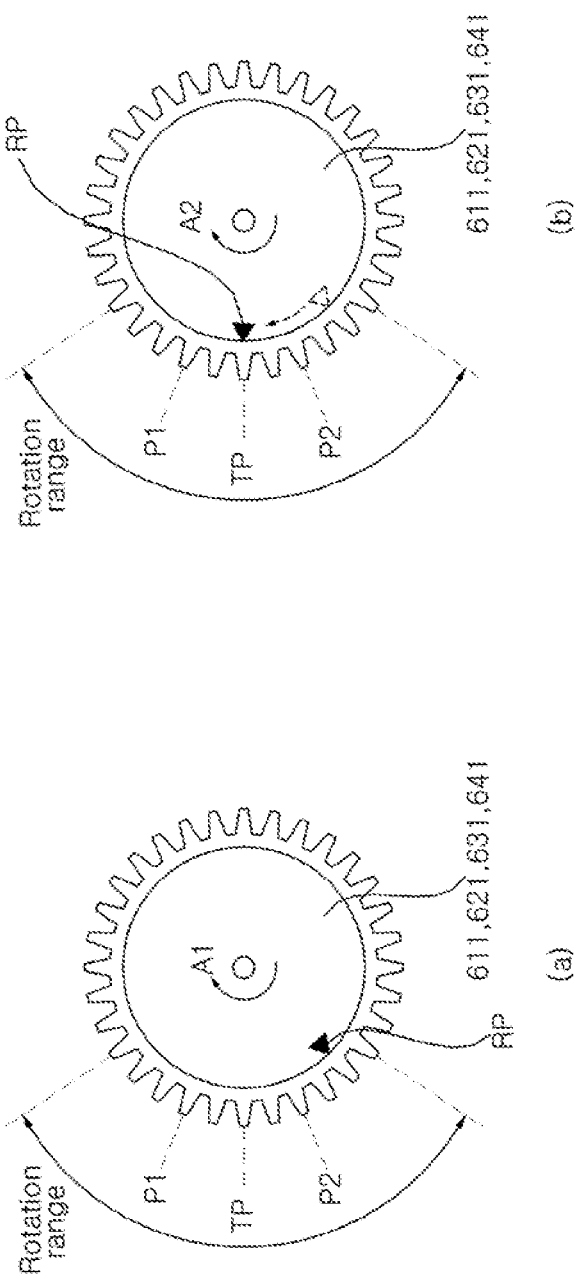
Figure 14:
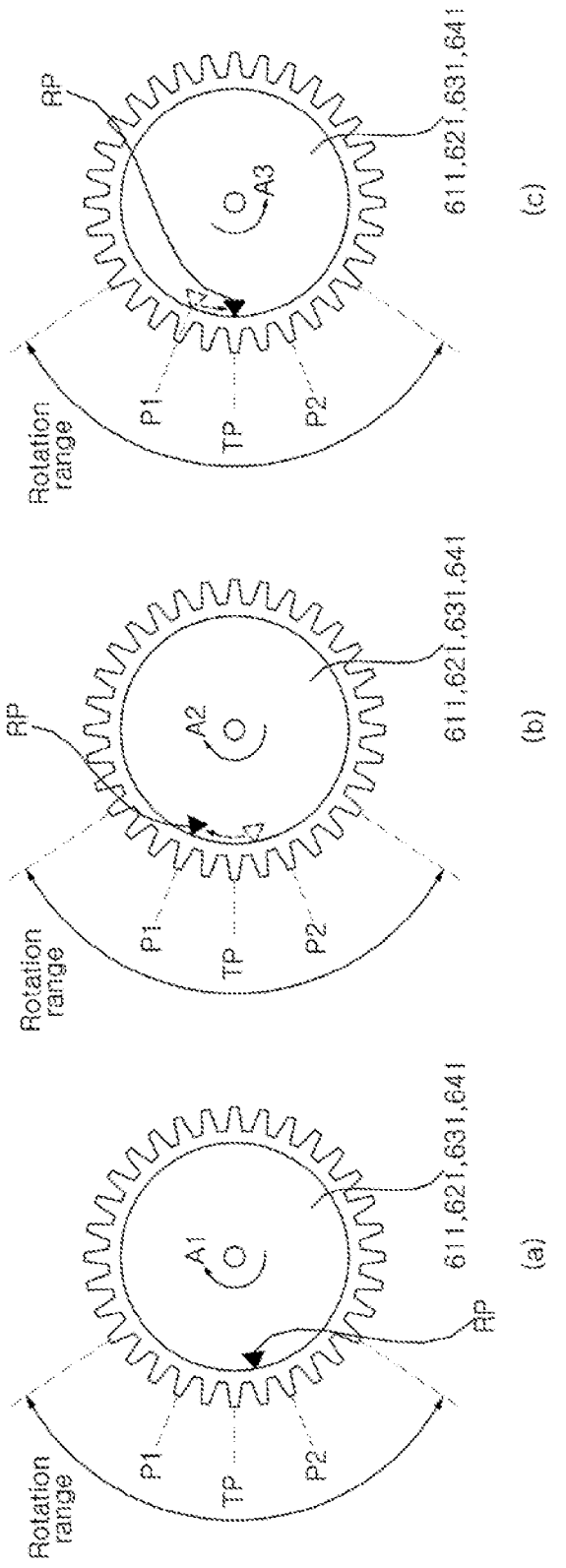

As shown in FIGS. 13 and 14, if the intermediate return command is received, when the first direction A1 and the second direction A2 are "identical with each other," the controller 110 may perform control as follows. That is, the controller 110 may control the rotation motor 60 so that it is located at the given reference point TP only once if the rotation motor 60 is located out of a transition range when the intermediate return command is received, and may control the rotation motor 60 so that it passes through the given reference point TP once and is located at the given reference point TP again if the rotation motor 60 is located within the transition range when the intermediate return command is received. This is described more specifically later.

In this case, the transition range is a part of the rotation range, and may be a range between a first point P1 and a second point P2 symmetrically spaced apart on the basis of the given reference point TP.

More specifically, the controller 110 may perform control as follows if the first direction A1 and the second direction A2 are "identical with each other" and the rotation motor 60 or the given point RP is located "out of the transition range" when the intermediate return command is received as shown in FIG. 13(a). That is, as shown in FIG. 13(b), the controller 110 may perform control so that the rotation motor 60 or the given point RP is rotated in the second direction A2 and passes through the second point P2, that is, an adjacent point of the first and second points P1 and P2, and is located at the given reference point TP.

In contrast, the controller 110 may perform control as follows if the first direction A1 and the second direction A2 are "identical with each other" and the rotation motor 60 or the given point RP "is located within the transition range" as shown in FIG. 14(a) when the intermediate return command is received. That is, the controller 110 may perform control so that the rotation motor 60 or the given point RP is rotated in the second direction A2 and passes through the point P1 opposite the point P2, that is, an adjacent point of the first and second points P1 and P2, as shown in FIG. 14(b), and the rotation motor 60 or the given point RP is rotated in a third direction A3 opposite the second direction A2 and is located at the given reference point TP as shown in FIG. 14(c).

That is, if the rotation motor 60 or the given point RP "is located within a transition range" (i.e., if the distance between the rotation motor 60 or the given point RP and the given reference point TP is a given value or less) when the intermediate return command is received, the controller 110 may perform control so that the rotation motor 60 or the given point RP passes through the given reference point TP once and is located at the given reference point TP again. Accordingly, a problem in that the rotation motor 60 is located after passing by the given reference point TP due to the inertial force of the rotation motor 60 can be solved.

The present disclosure has one or more of the following effects.

First, drying can be performed on an object to be dried without a need for a user to hold the dryer because the dryer can be used and manipulated with it mounted on the stand.

Second, the direction of discharge air for drying can be automatically changed by moving the receptacle in a given direction by controlling the operation of the moving apparatus information on an object to be dried, which is detected by the sensing apparatus.

Third, the discharge direction of air for drying can be changed because the rotation motor is rotated within a given range based on a reference point and thus the receptacle is moved in a given direction. Furthermore, the receptacle can be returned to its original position by locating the rotation motor at a reference point.

The stand according to embodiments of the present disclosure has been described above. However, the present disclosure is not limited to the embodiments, and may be implemented within various modifications or an equivalent range which may be predicted by a person having ordinary skill in the art to which the present disclosure pertains without departing from the gist of the present disclosure.

What is claimed is:

1. A dryer stand on which a dryer for discharging air for drying is mounted, the dryer stand comprising:
    a stem extending along a first axis in a vertical direction;
    a base positioned under the stem;
    a receptacle positioned over the stem and configured to receive the dryer;
    a mover connected to the receptacle and comprising at least one motor, the at least one motor being rotated in both directions within a given rotation range; and
    a controller configured to:
        control rotation of the at least one motor in a forward direction and a backward direction so that the receptacle is moved in a predetermined direction when a position change command for the receptacle is received by the controller, and
        control forward and backward rotation of the at least one motor to return the receptacle to an original position of the receptacle when a position return command for the receptacle is received by the controller,
    wherein the original position of the receptacle is a position of the receptacle when the at least one motor is located at a predetermined reference point, and
    wherein the controller is further configured to:
        control the at least one motor to rotate in a second direction to the predetermined reference point when the position return command is received while the at least one motor is rotated in a first direction in response to the position change command, and
        control the at least one motor to rotate in the second direction to pass the predetermined reference point once and rotate in a third direction opposite to the second direction to arrive the predetermined reference point again, if the at least one motor is located within a transition range which is a part of the given rotation range and the first direction is identical to the second direction when the position return command is received.

2. The dryer stand of claim 1, wherein the at least one motor rotates within the given rotation range extending a predetermined amount in the forward direction and a predetermined amount in the backward direction, and
    wherein the predetermined amount of rotation in the forward direction of the at least one motor is symmetric to the predetermined amount of rotation in the backward direction of the at least one motor about a predetermined reference point.

3. The dryer stand of claim 2,
    wherein the first direction may be any one of the forward direction and the backward direction, and
    wherein the second direction may be any one of the forward direction and the backward direction.

4. The dryer stand of claim 3, wherein the controller is further configured to control the at least one motor to stop rotation in the first direction and to rotate in the second direction until the at least one motor is located at the predetermined reference point when the position return command is received and the first direction is different than the second direction.

5. The dryer stand of claim 3, wherein the controller is further configured to control the at least one motor so that the at least one motor is located at the predetermined reference point only once if the at least one motor is located out of the transition range and the first direction is identical to the second direction when the position return command is received.

6. The dryer stand of claim 3, wherein within the transition range, the at least one motor extends to a first point in the forward direction and to a second point in the backward direction, and
    wherein the controller is further configured to control the at least one motor to rotate in the second direction, passing through one of the first point and the second point, to the predetermined reference point, when the first direction is identical to the second direction and the at least one motor is located out of the transition range when the position return command is received.

7. The dryer stand of claim 3, wherein the controller is further configured to control the at least one motor to stop rotation in the first direction and to rotate in the second direction to the predetermined reference point if the at least one motor is located out of the transition range and the first direction is different than the second direction when the position return command is received.

8. The dryer stand of claim 1, wherein the at least one motor of the mover includes:
    an elevator comprising an electrically driven elevation motor to move the receptacle upwards and downwards along the first axis;
    a rotator comprising an electrically driven rotation motor to rotate the receptacle about the first axis;
    a tilter comprising an electrically driven tilting motor to tilt the receptacle along a second axis to move the receptacle forward and backward, the second axis being perpendicular to the first axis; and
    a stem rotator comprising an electrically driven stem rotation motor to rotate the receptacle in left and right directions by rotating the stem left and right about a third axis,
    wherein the third axis is perpendicular to the first axis and to the second axis.

9. The dryer stand of claim 8, further comprising a sensor to detect a position and a size of an object to be dried,
    wherein the position change command is a signal to instruct control of at least one of a degree that the receptacle is moved upwards and downwards along the first axis, a degree that the receptacle is rotated along the third axis, or a degree that the receptacle is rotated forward and backward along the second axis, so that air discharged from the dryer is directed toward the object to be dried based on the position and the size of the object to be dried detected by the sensor.

10. The dryer stand of claim 1, wherein the at least one motor of the mover includes a tilting motor, wherein the receptacle includes:
an upper tub including a tub body having a substantially hemispherical shape;
a tub cover surrounding the upper tub and coupled to the upper tub; and
a lower tub coupled to the upper tub, and wherein the controller controls the tilting motor to tilt the receptacle along a second axis, the second axis being perpendicular to the first axis.

11. The dryer stand of claim 10, wherein tub cover includes an arc shaped outer surface, wherein the arc shaped outer surface of the tub cover includes tilting gear teeth, and wherein the tilting motor includes a pinion that engages the tilting gear teeth of the arc shaped outer surface of the tub cover to tilt the receptacle forward and backward along the second axis.

12. The dryer stand of claim 11, further comprising:

a stem rotation motor configured to rotate the stem and the receptacle around a third axis, the third axis being perpendicular to the first axis and the second axis.

13. The dryer stand of claim 1, wherein the at least one motor of the mover includes:

a tilting motor configured to tilt the receptacle forward and backward along a second axis, the second axis being perpendicular to the first axis; and
a stem rotation motor configured to rotate the stem and the receptacle around the first axis.

14. The dryer stand of claim 10, further comprising a sensor configured to detect a position and a size of an object to be dried, wherein the controller is further configured to control the tilting motor to move the dryer toward the object.

15. The dryer stand of claim 12, further comprising a sensing apparatus configured to detect a position and a size of an object to be dried, wherein the controller is further configured to control the tilting motor and the stem rotation motor to move the dryer toward the object.

16. The dryer stand of claim 12, further comprising an elevator comprising an electrically driven elevation motor to move the receptacle upwards and downwards along the first axis.

17. The dryer stand of claim 16, further comprising a sensor configured to detect a position and a size of an object to be dried, wherein the controller is configured to control the tilting motor, the elevator and the stem rotation motor to move the dryer toward the object.

* * * * *